United States Patent [19]
Shimojima

[11] 4,273,414
[45] Jun. 16, 1981

[54] ZOOM LENS

[75] Inventor: Masatoshi Shimojima, Tokyo, Japan

[73] Assignee: Vivitar Corporation, Santa Monica, Calif.

[21] Appl. No.: 965,340

[22] Filed: Dec. 1, 1978

Related U.S. Application Data

[62] Division of Ser. No. 750,828, Dec. 15, 1976, Pat. No. 4,141,636.

[30] Foreign Application Priority Data

Jan. 20, 1976 [JP] Japan .................................. 51-514228

[51] Int. Cl.³ .............................................. G02B 7/10
[52] U.S. Cl. .................................... 350/429; 350/449
[58] Field of Search ................. 350/187, 206; 354/196

[56] References Cited

U.S. PATENT DOCUMENTS

| | | | |
|---|---|---|---|
| 3,059,533 | 10/1962 | Mellberg | 350/187 |
| 3,566,765 | 3/1971 | Nagashima | 350/206 |
| 3,889,282 | 6/1975 | Hashimoto | 354/196 |
| 3,906,529 | 9/1975 | Filipovich | 354/196 |
| 3,944,340 | 3/1976 | Hashimoto | 350/187 |

*Primary Examiner*—Jon W. Henry
*Attorney, Agent, or Firm*—DeLio and Montgomery

[57] ABSTRACT

A mechanism for a zoom lens having relatively movable lens groups where the aperture defining means moves with one of the lens groups.

5 Claims, 9 Drawing Figures

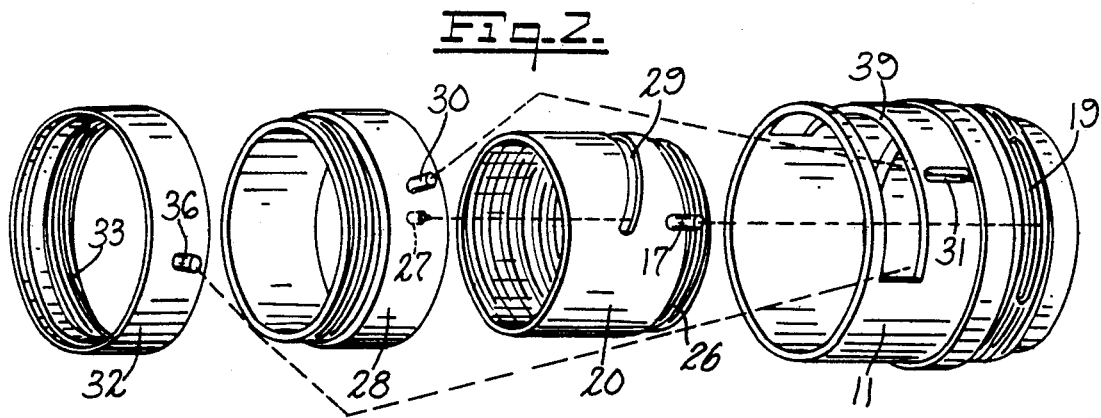
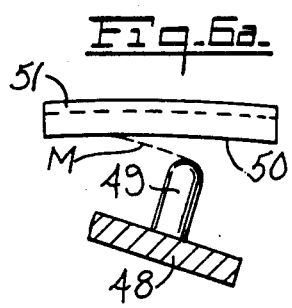
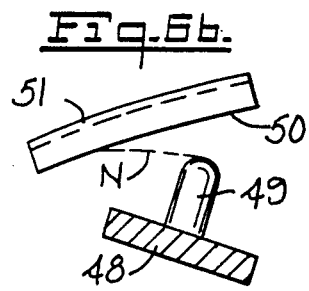
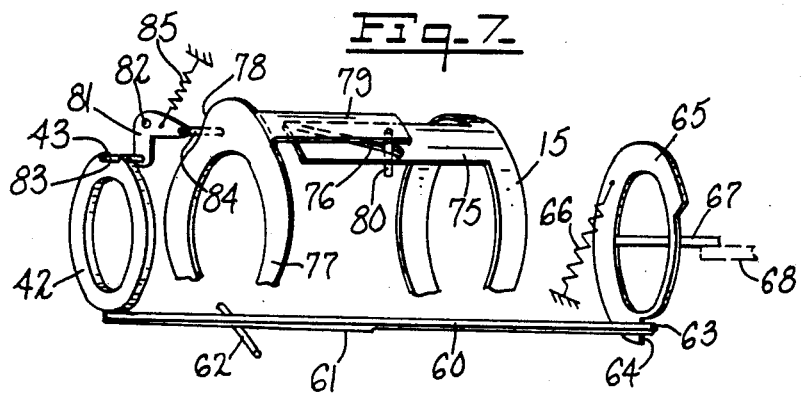

ZOOM LENS

This is a division, of application Ser. No. 750,828, filed Dec. 15, 1976 now U.S. Pat. No. 4,141,636.

This invention relates to lenses and more particularly relates to zoom lenses where the aperture defining diaphragm mechanism is moved axially along the lens housing during zooming.

Parent application Ser. No. 750,828, now U.S. Pat. No. 4,141,636, discloses a wide angle zoom lens with control over aperture size as a function of equivalent focal length. Such variable aperture control is quite useful in lenses where the aperture defining mechanism moves with one of the zooming groups as disclosed in U.S. Pat. No. 4,159,165.

The present invention provides a new and improved zooming mechanism for a lens where the aperture defining means moves during change in focal length.

Briefly stated, the invention in one form thereof in a lens including a body member comprises a zoom selection ring exterior of the housing and rotatable thereabout and a zoom ring within the housing and rotatable with the selection ring. A first lens mounting member which also includes the aperture defining mechanism is moved axially without rotation by the zoom ring. A member supports another lens group and threadably engages a sleeve on the zoom ring. A follower extends from the sleeve-like member into a cam slot defined in the zoom ring. A second follower extends from the sleeve-like member into an axial slot in the housing member so that when the zoom ring rotates the cam slot causes the follower on the sleeve member to move axially in the second slot at a rate determined by the contour of the cam slot. A focusing lens mounting member is threadably engaged to the sleeve member and is movable axially thereon upon rotation thereof for focusing and an external focusing ring is rotatable on the housing and connected to the focusing lens mount.

An object of this invention is to provide a new and improved zooming and focusing mechanism for a zoom lens of the type having a movable aperture defining means.

The features of the invention which are believed to be novel are particularly pointed out and distinctly claimed in the concluding portion of this specification. The invention, however, both as to its organization and operation together with further objects and advantages thereof may best be appreciated by reference to the following detailed description taken in conjunction with the drawings, wherein:

FIG. 2 is a view, in perspective, of disassembled portions of the lens of FIG. 1;

FIGS. 6a and 6b are views, somewhat schematic, of portions of the stop down mechanism of the lens of FIG. 1; and FIG. 7 is an expanded view in perspective of an alternate aperture determining mechanism embodying the invention.

Figure 1:
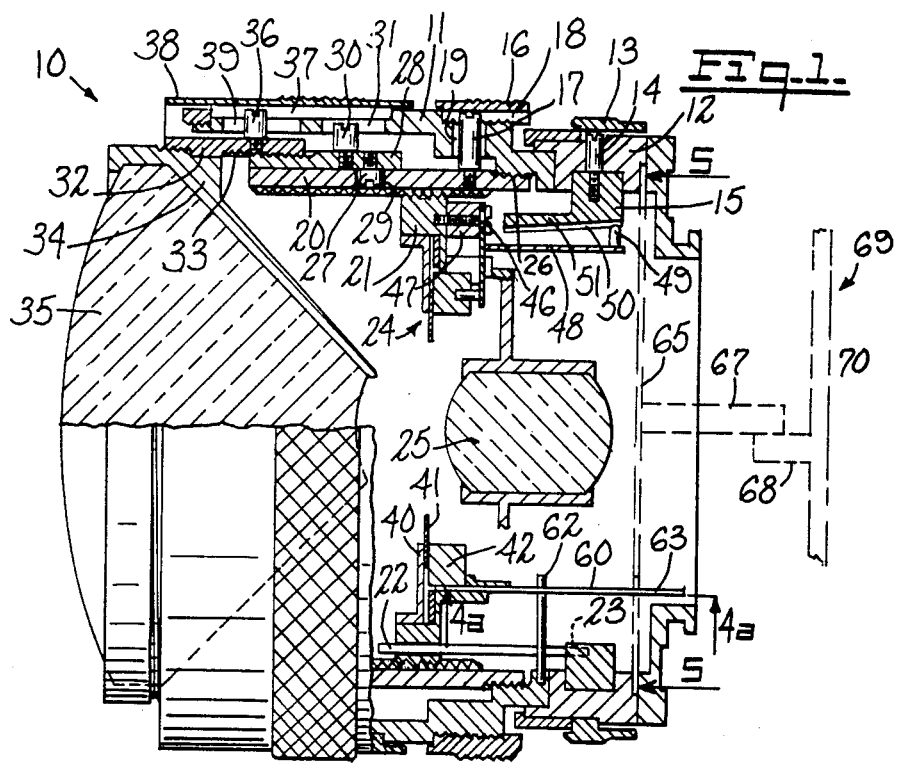
FIG. 1 is a side elevation, in section of a lens embodying the invention.

A lens 10 embodying the invention is first described with reference to FIGS. 1 and 2. Lens 10 comprises a main housing member 11 with a rear auxiliary housing member 12 thereon. Rotatably mounted to housing 12 is a relative aperture setting ring 13 connected by a pin 14 to an aperture ring 15. The relative aperture setting mechanism is hereinafter described.

A zoom operating ring 16 is rotatably mounted on housing 11, and receives a pin 17 in an axial slot 18 therein which extends through a lateral slot 19 in housing 11 and is received in a zoom ring 20.

Zoom ring 20 is internally threaded and receives therein mounting member 21 on mating threads. Mounting member 21 is prevented from rotation, as for example by a rod 22 extending therethrough and anchored at 23 on housing 11 or 12. Other means may be provided for ensuring only linear movement of mounting member 21. Mounting member 21 carries an aperture defining diaphragm mechanism 24 and a rear lens grouping 25.

Zoom ring 20 is threaded to housing 11 at 26 and moves rotatively and axially upon rotation of ring 16. A pin 27 carried by a ring 28 extends into a cam slot 29 in zoom ring 20. A second pin 30 in ring 28 extends into an axial slot 31 in housing 11.

As thus far described, when zoom control ring 16 is rotated, ring 20 rotates and mounting member 21 advances axially on the mating threads at a rate determined by the pitch of the threads. As zoom ring 20 rotates, pin 30 in ring 28 moves axially in slot 31 at a rate and direction determined by the contour of cam slot 29.

A focusing mount 32 is threaded to ring 28 at 33 and moves axially with ring 28 during zooming. Focusing mount 32 carries a mount 34 for a front negative lens grouping 35. A pin 36 extends from focusing mount 32 into an axial slot 37 in a focus ring 38 through lateral slot 39 in housing 11. Thus, lens grouping 35 may be moved axially for focusing by rotation of ring 38.

Upon rotation of zoom control ring 16, lens groupings 25 and 35 will move at rates predetermined by the various threads and cam slots. Such movements will depend upon the optical design of the lens groupings. A lens which may utilize the herein disclosed mechanism is disclosed in copending application Ser. No. 750,829, filed Dec. 15, 1976, now U.S. Pat. No. 4,159,165. This co-pending application discloses the optics of a lens where grouping 25 moves axially forward to increase the focal length while lens grouping 35 moves to maintain focus.

As mounting member 21 moves axially with the aperture defining mechanism 24 and lens grouping 25, the position of the exit pupil will change, resulting in a change of relative aperture if no aperture compensation is provided.

Figure 3:
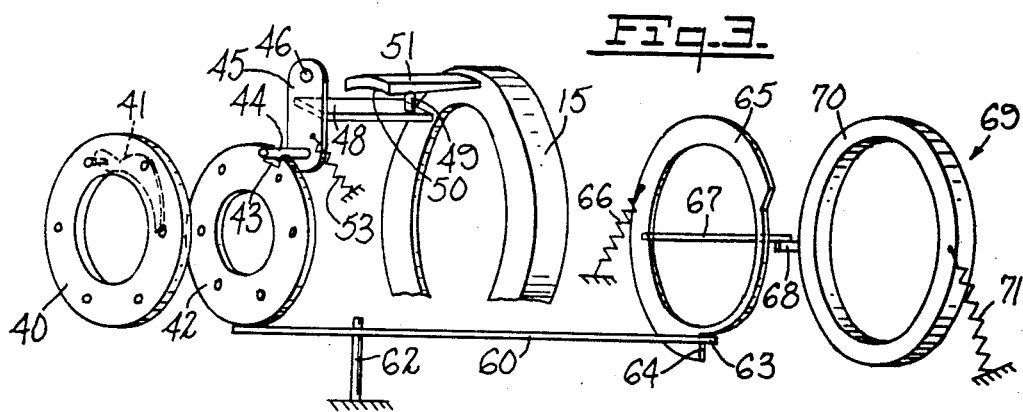
FIG. 3 is a diagrammatic expanded view in perspective, of the aperture determining mechanism of the lens of FIG. 1.

Reference is now made to FIGS. 1 and 3. Diaphragm mechanism 24 comprises a fixed ring 40 having a plurality of diaphragm or iris blades 41 pivotally mounted thereto (only one shown in FIG. 3). Blades 41 are also connected to aperture control ring 42 so that rotation of ring 42 determines the aperture defined by blades 41. This is conventional construction.

Aperture control ring 42 has a slot 43 therein which receives a pin 44 on the lower end of a lever 45 pivoted at its upper end, through a pin 46 and spacer 46, to mounting member 21. Lever 45 has a rearwardly extending arm 48 which is arranged to cooperate with a cam or stopping surface 50 on an arm 51 extending from aperture ring 15. The undersurface 50 of arm 51 is axially contoured as a function of focal length. When projection 49 engages surface 50, the point of contact determines the aperture of the lens as a function of focal length and maintains a constant selected relative aperture (F/number) over the focal length range of the lens. A spring 53 biases control ring 42 through lever 45 toward a full aperture position, which is determined, as hereinafter described, as a function of focal length. When ring 42 is moved counter-clockwise as viewed in FIG. 3, it will move the diaphragm blades 41 to a stop position determined by the angular position of stopping surface 50 and arm 51.

Figure 4A:
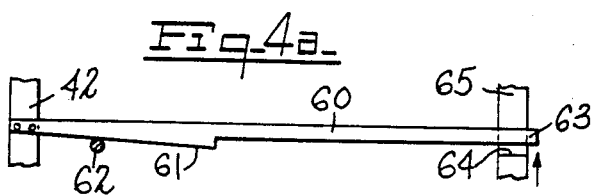
FIG. 4a is a view seen in the plane of lines 4a—4a of FIG. 1, showing a diaphragm operating rod.
Figure 4B:
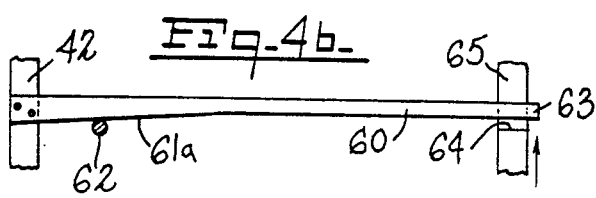
FIG. 4b is a view similar to FIG. 4a, of another diaphragm operating rod.
Figure 5:
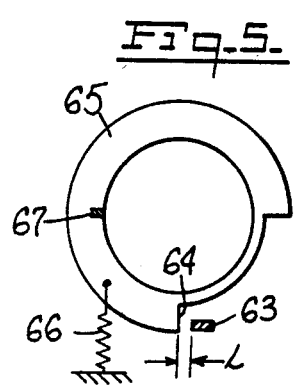
FIG. 5 is a view seen in the plane of lines 5—5 of FIG. 1.

An aperture stop down rod 60 is rigidly connected to aperture control ring 42 and extends rearwardly thereof. Rod 60 has a camming surface 61 thereon which normally bears on a fixed surface in housing 11, exemplified by pin 62. At full aperture, constant relative aperture is determined by cam 61 being urged against pin 62 by spring 53. As mounting member 21 moves axially, cam surface 61 bearing on a pin 62 rotates control ring 42 to vary the aperture defined by blades 41 as a function of focal length. Also, projection 49 is slightly rotated to maintain axial moving clearance with surface 50, where necessary. As shown in FIG. 4a, the camming surface 61 may decrease the aperture with focal length, while the camming surface 61a, of FIG. 4b may increase the aperture with focal length. The shape of the camming surface on rod 60 will be determined by the optical parameters of the lens system, and maybe linear or curved as required.

The free end 63 of rod 60 extends adjacent a shoulder 64 of an aperture stop down ring 65 biased by a spring 66. Spring 66 is stronger than spring 53. Ring 65 has an arm 67 thereon normally engaged by an arm 68 of a camera stop down mechanism 69. As shown, the camera mechanism comprises a ring 70 biased by a spring 71. Ring 70 is rotated counterclockwise (as shown in FIG. 3) by spring 71 when the camera shutter is released, or just prior thereto and is exemplary of any camera stop down mechanism. This releases stop down ring 65, shoulder 64 engages rod 60, rotates control ring 42, pivots lever 45 until projection 49 engages the stopping member, surface 50, and stops down the aperture defining diaphragm mechanism to the predetermined relative aperture. Spring 66 is selected to be less strong than spring 71. In this manner the selected relative aperture is maintained.

As shown the axial position of stop projection 49, with respect to surface 50 will determine the final aperture dimension as a function of focal length, since surface 50 is contoured axially as a function of focal length.

The end 63 of rod 60 has a variable clearance L with shoulder 64 to permit setting of the aperture with focal length to maintain constant selected relative aperture. As mounting member 21 moves axially to change focal length, there will be slight rotative movement of rod 60, control ring 42 and projection 49.

FIG. 6a exemplifies the relation of projection 49 and surface 50 at an intermediate selected relative aperture, with arm 48 in the full aperture position. The position of arm 48 and control ring 42 will be modified by the cam of rod 60 as a function of focal length at full relative aperture. However, it is the angular position of surface 50 which determines the selected stop down relative aperture. When aperture ring 65 is released, projection 49 moves along the line M until it engages surface 50, stopping down the aperture to the selected F/number.

If the lens were to be utilized at full aperture, surface 50 would be positioned with respect to projection 49 so closely that there would only be clearance for projection 49 to move axially without binding, or to have light sliding contact thereon. In this situation, during change of focal length of zooming, diaphragm control ring 42 under the influence of rod 60 would rotate slightly to maintain the positioned relation of projection 49 with respect to the focal length contoured surface 50.

FIG. 6b exemplifies ring 51 and surface 50 set to a smaller relative aperture. It will be noted that projection 49 will move further along the line N from the full aperture position before contacting surface 50 which defines the stop for the selected relative aperture, thus resulting in a lesser aperture being defined by diaphragm mechanism 24.

Where the camera is of the stop down metering type, the operation is the same, only the diaphragm is initially stopped down when the metering system is activated, rather than just prior to exposure. Depending on the mechanics of the camera, the diaphragm may then be reset to full aperture if desired.

Another embodiment of the invention is shown in FIG. 7 where reference numerals similar to those of FIG. 3 identify similar elements. Aperture ring 15 has an arm 75 extending therefrom with a cam slot 76 defined therein as a function of focal length. A stopping member in the form of a ring 77 is rotatable on mounting member 21, and defines a contoured stopping surface or edge 78 thereon. An arm 79 extends rearwardly of ring 77 and has a follower 80 in cam slot 76. Ring 77 will rotate slightly with axial movement of member 21 and position surface 78 as a function of focal length, as well as selected relative aperture. A lever 81 is pivoted to member 21 at 82, and carries a pin 83 at one end thereof in slot 43 of diaphragm control ring 42. A stop pin 84 extends from the other end of lever 81 past surface 78. The stop down position of the diaphragm is determined by the position of surface 78. Lever 81 and diaphragm control ring 42 are biased toward the open position by spring 85, and spring 85 urges rod 60 into engagement with pin 62. With increase in focal length (ring 77 moving forward) ring 77 moves counter-clockwise (as viewed in FIG. 7) and surface 78 is positioned to stop pin 84 as a function of focal length.

Where the lens is made to be utilized with a fully automatic camera of the shutter preferred type and the aperture selection ring is set to the EE of equivalent setting, the connection between selection ring 13 and aperture ring 15 may be made disconnectable and stop down positioning of aperture ring 15 placed under selection control of the camera.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. A zoom lens comprising a housing member and having two lens groupings axially movable for zooming and maintaining focus, a zoom selection ring exterior of said housing and rotatable thereabout a zoom ring within said housing and rotatable with said selection ring, a first lens mounting member movable axially upon rotation of said zoom ring, a first slot defined in said zoom ring, a sleeve-like member rotatably mounted about said zoom ring and having a follower in said first slot, another follower on said sleeve-like member extending into a second axial guide slot in said housing whereby when said zoom ring rotates said first slot causes said sleeve-like member to move axially in said second slot at a rate determined by the contour of said first slot, a focusing lens mounting member threadably engaged to said sleeve-like member and movable axially thereon upon rotation thereof for focusing, and a focusing ring rotatable on said housing and connected to said focusing lens mount.

2. The lens of claim 1 wherein said lens includes a diaphragm mechanism for determining an aperture movable with said first lens mounting member.

3. The lens of claim 2 further including means responsive to axial movement of said mounting member for actuating said diaphragm mechanism to maintain a constant relative aperture of said lens with change in focal length.

4. The lens of claim 1 wherein said diaphragm mechanism includes a rotatable control ring which varies the aperture, a rod-like member extending from said ring and having a camming surface thereon normally engaging a fixed surface whereby movement of said rod-like member over said surface produces rotation thereof and varies the aperture defined by said control ring as a function of the contour of said camming surface.

5. The lens of claim 4 further including a relative aperture selection ring, an aperture stopping means settable by said selection ring as a function of focal length, an aperture stop member connected to said control ring and normally out of engagement with said stopping means, and means for rotating said rod-like member and said control ring until said stop member engages said stopping means and causes said diaphragm mechanism to define a selected relative aperture.

* * * * *